United States Patent [19]

Quiney et al.

[11] Patent Number: 4,674,282
[45] Date of Patent: Jun. 23, 1987

[54] MASTER CYLINDER RESERVOIR

[75] Inventors: Kenneth M. Quiney; Stephen J. Hinsley, both of Birmingham, both of England

[73] Assignee: Lucas Industries Public Limited Company, Birmingham, England

[21] Appl. No.: 704,926

[22] Filed: Feb. 25, 1985

[30] Foreign Application Priority Data

Feb. 28, 1984 [GB] United Kingdom ............... 8405163
Jul. 20, 1984 [GB] United Kingdom ............... 8418625

[51] Int. Cl.⁴ .............................................. F15B 7/00
[52] U.S. Cl. ...................................... 60/581; 60/585; 60/592
[58] Field of Search ............... 60/581, 585, 592, 562; 137/571, 572, 575

[56] References Cited

U.S. PATENT DOCUMENTS

| | | | |
|---|---|---|---|
| 1,930,033 | 10/1933 | Apple | 60/592 |
| 3,724,497 | 4/1973 | Federer et al. | 137/575 |
| 3,906,995 | 9/1975 | Schmidt | 137/575 |
| 3,914,943 | 10/1975 | Lewis | 60/585 |
| 4,005,796 | 2/1977 | Hirai et al. | 60/562 |
| 4,168,613 | 9/1979 | Nakagawa | 60/562 |
| 4,505,113 | 3/1985 | Reinartz et al. | 60/585 |
| 4,505,519 | 3/1985 | Muterel | 60/581 |

*Primary Examiner*—Abraham Hershkovitz
*Attorney, Agent, or Firm*—Holman & Stern

[57] ABSTRACT

A master cylinder reservoir for use in a tractor hydraulic braking system has a pair of separate compartments, each adapted for connection to a respective one of a plurality of pressure cylinders. The compartments are interconnected by a flexible connector such as a convoluted tube, and the reservoir is advantageously made in a single piece by blow molding enabling the relative positions of the cylinders to vary so that the reservoir can be readily mounted by spigots engaging bores in the cylinders. The reservoir also has a flanged rigid tubular connection component molded into it during the reservoir molding operation, the material of the reservoir closely surrounding opposed surfaces of a flange of the component to resist longitudinal withdrawal of the component.

13 Claims, 5 Drawing Figures

MASTER CYLINDER RESERVOIR

BACKGROUND OF THE INVENTION

1. Field of the Invention

This invention relates to a master cylinder reservoir primarily for use in the hydraulic braking system of an agricultural tractor.

2. Description of the Prior Art

In a typical tractor braking system, two master cylinders are often employed, each operated independently of the other by means of its own driver-operated pedal and each operating a brake on a respective one of a pair of wheels at either side of the tractor, thereby enabling the driver to apply steering to the tractor by operating one or other of the pedals, depending upon the direction of turn required.

Several systems of this kind have already been proposed. In one arrangement, a pair of pressure cylinders disposed side by side are supplied from a single reservoir which is either mounted on one cylinder and connected by piping to the other or is remotely mounted and connected by piping to both cylinders. In another arrangement, each pressure cylinder is provided with its own reservoir. Although these arrangements are, in varying degrees, complicated and correspondingly expensive, they have usually been necessary, hitherto, because of difficulties encountered in mounting the components in vehicles, as a result, for example, of variations between the centers of mounting holes on the pressure cylinders and distortions in the mounting bulkheads of vehicles.

BRIEF SUMMARY OF THE INVENTION

An object of the invention is to provide a reservoir and a combination of such a reservoir with a plurality of pressure cylinders, and reservoir being relatively simple and inexpensive to manufacture and such as to enable the aforesaid difficulties to be largely avoided.

According to the invention, a reservoir for use in an hydraulic braking system comprises a plurality of separate compartments each adapted for connection to a respective one of a plurality of pressure chambers, and flexible connector means interconnecting the compartments in such a manner as to permit the flow of braking fluid between the compartments.

In one conventional arrangement the compartments and connector means are made in a single piece, preferably by a blow molding process. The connector means may advantageously be a hollow convoluted or bellows formation.

The pressure chambers may be in respective distinct cylinders or formed in a single cylinder to provide a tandem master cylinder assembly, the chambers being connected respectively to the reservoir compartments of a reservoir of the invention.

BRIEF DESCRIPTION OF THE DRAWINGS

The invention will now be described, by way of example, with reference to the accompanying drawings wherein.

DETAILED DESCRIPTION

Figure 1:
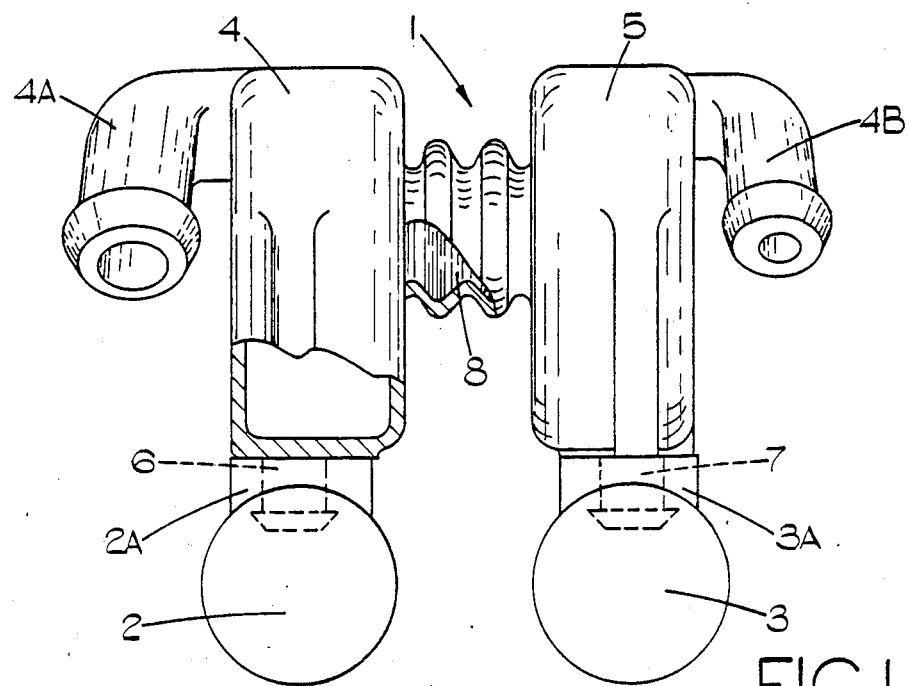
FIG. 1 is an end elevational view, partly in cross-section of one form of master cylinder assembly of the invention.
Figure 2:
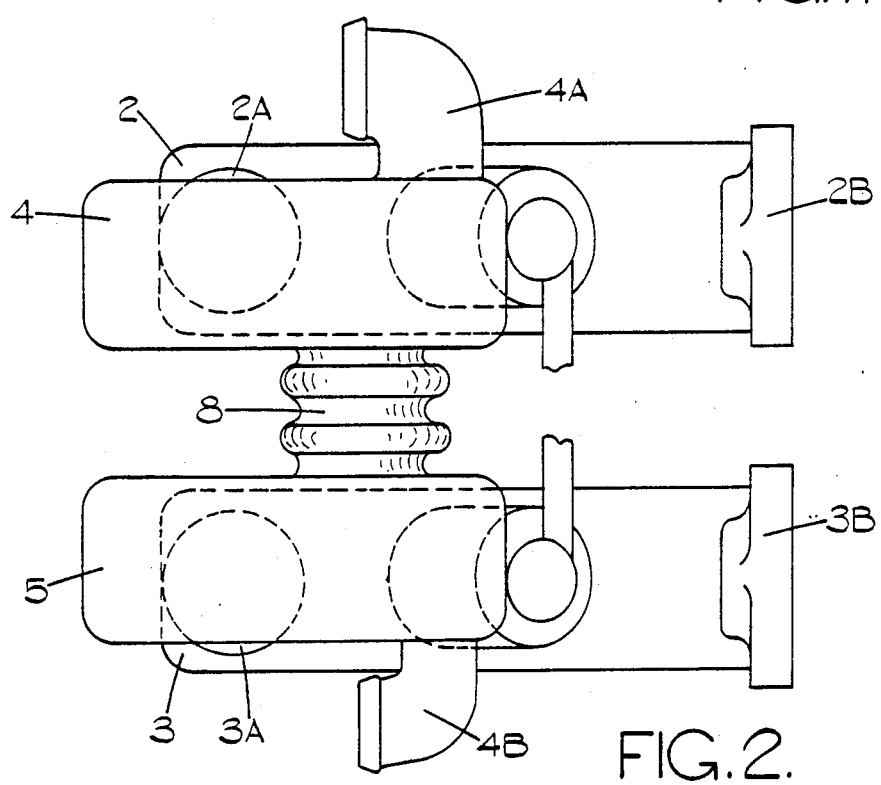
FIG. 2 is a top plane view of the assembly of FIG. 1.

In FIGS. 1 and 2 of the drawings, there is shown a reservoir, indicated generally by the reference 1, mounted in working relationship on a pair of pressure cylinders 2, 3 forming part, for example, of a tractor hydraulic braking system and being conveniently of the center valve type, as is generally conventional in such systems. Each cylinder has a flange 2B, 3B for use in mounting the cylinder in its position for use, such as on a vehicle bulkhead, for example.

The reservoir includes a pair of compartments 4, 5 each having a spigot 6, 7 for forming a fluid-tight connection with a boss 2A, 3A of one of the pressure-cylinders. Each boss would normally have a cylindrical insert of rubber or plastics material (not shown) inserted in a bore thereof to receive one of the reservoir spigots in fluid-tight engagement. In this embodiment, the compartments are provided with respective fluid connections 4A, 4B for connection to the tractor hydraulic system so that a continuous flow of fluid through the compartments is maintained during operation of the tractor, in conventional manner.

Communication between the compartments 4 and 5 is provided by a flexible connector means shown as a convoluted tube or bellows 8. The reservoir comprising the compartments 4 and 5, spigots 6, 7, connections 4A, 4B and the connector means 8 may advantageously be formed as a single piece by a blow molding process and can thus be produced inexpensively.

It will be seen that the convoluted connector means 8 permits a considerable degree of departure of the compartments in all directions from the positions shown in FIGS. 1 and 2, thereby providing considerable latitude in the relative positions of the pressure cylinders when mounted in their positions of use. Such possible variables as the centers of the bores receiving the spigots 6, 7, the centers of holes in the cylinder fixing flanges 2B, 3B, and discrepancies in the mounting bulkhead of the tractor can be accommodated by the reservoir assembly, even when made as a one-piece item in the manner described.

Figure 3:
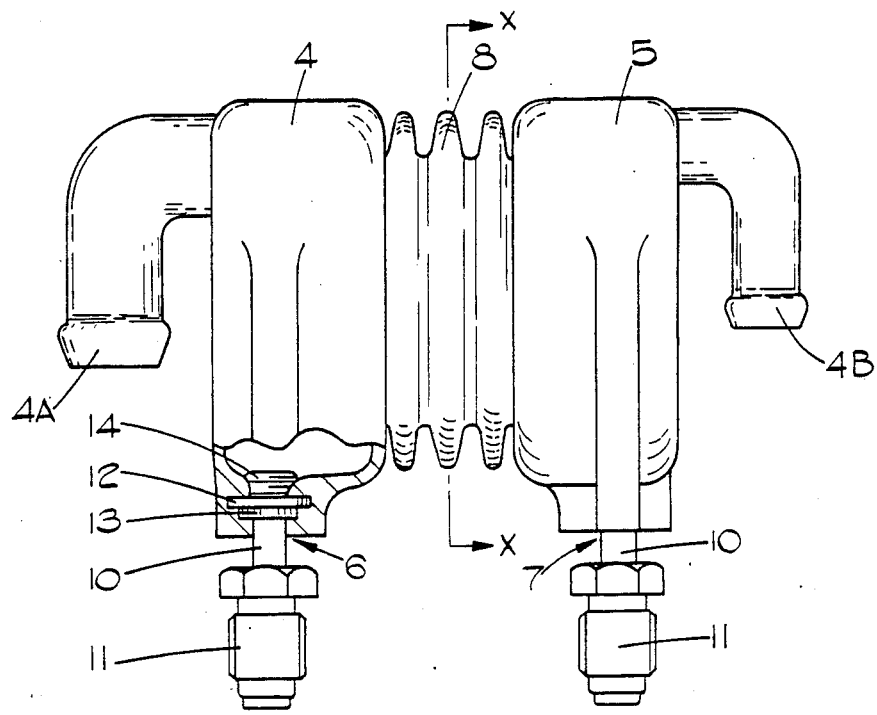
FIG. 3 is an end elevational view, partly in cross-section, of an alternative embodiment of the reservoir of the invention for use in a master cylinder assembly.
Figure 4:
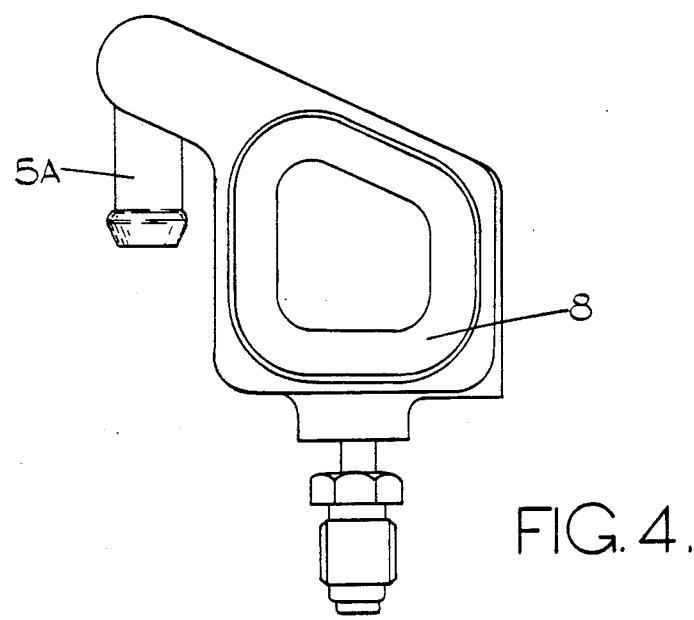
FIG. 4 is a cross-sectional view taken along line X—X of FIG. 3.

The embodiment shown in FIGS. 3 and 4 is generally similar to that previously described, having reservoir compartments 4, 5, interconnected by a convolute connector means 8. The compartments are provided with mounting spigots 6, 7 and fluid flow connections, as before. One principal difference in this embodiment is in the size and cross-sectional shape of the connector means 8 which, as can be seen from FIG. 4, generally follows the outline shape of the sides of the compartments and is nearly co-extensive in area with said sides. The reservoir of this embodiment may again advantageously be integrally formed by a blow molding process.

Another principal difference lies in the nature of the outlet connections 6, 7, each of which includes a rigid metal tube 10 secured to the reservoir and a standard plug insert 11 for use in connecting the tube 10 to an appropriate threaded bore of a pressure cylinder. As can be seen particularly from the left-hand side of FIG.

3, each tube 10 is provided with a radial flange 12 formed by a separate component which is secured to the tube by a crimping operation. An axially extending part 13 of the flange has a serrated outer surface and such serrations may conveniently be formed during the crimping operation which secures the flange member to the tube 10. It would, of course, be possible to secure the flange 12 in position on the tube by alternative means such as welding or soldering, or to form it integrally with the tube, in which case the serrations would be pre-formed in a separate step.

The connectors 6 and 7 are secured to the compartments 4 and 5 during the molding operation which forms the reservoir 1. The assembly of tube 10 and its attached flange 12 is held firmly, by an appropriate jig or other support, in a position such that the flowable material being molded to form the reservoir 1 can pass around the flange 12 to either side thereof so that the material comes into contact not only with opposed surfaces of the flange, but at one side of the flange with the cylindrical outer surface of the tube 10 and at the opposite side of the flange with an outwardly flared portion 14 of the tube. When the material hardens, the connector 7 will be rigidly held within the material of the reservoir, being precluded from axial withdrawal by the flange 12 and from rotation by the serrated portion 13. An excellent fluid tight integrity is obtained between the reservoir and connectors 6 and 7 attributable partly to the intimate contact between the material of the reservoir and the outwardly flared portion 14 of each connector.

The plug insert 11 may either be present on the tube 10, being retained thereon by a further outwardly flared end portion (not shown, but similar to 14) of the tube, to form a sub-assembly before the molding operation; alternatively, the plug insert may be added after the molding operation, the provision of the further outwardly flared portion then being deferred until such time as the insert 11 has been placed around the tube 10. Since the connectors 6, 7 are identical, only one has been illustrated in detail but it will be understood that both are secured to the reservoir by the method described above. This provides a very simple and convenient manner of securing a rigid tube 10 to a reservoir in order to form an outlet connection and is not subject to the complexity of many prior art arrangements. This type of connector and its manner of fixing may be applied to any embodiment of the invention, including those described herein. It will be understood that the precise nature of the insert 11 and the shape and arrangement of the flange 12 may be varied according to requirements.

Figure 5:
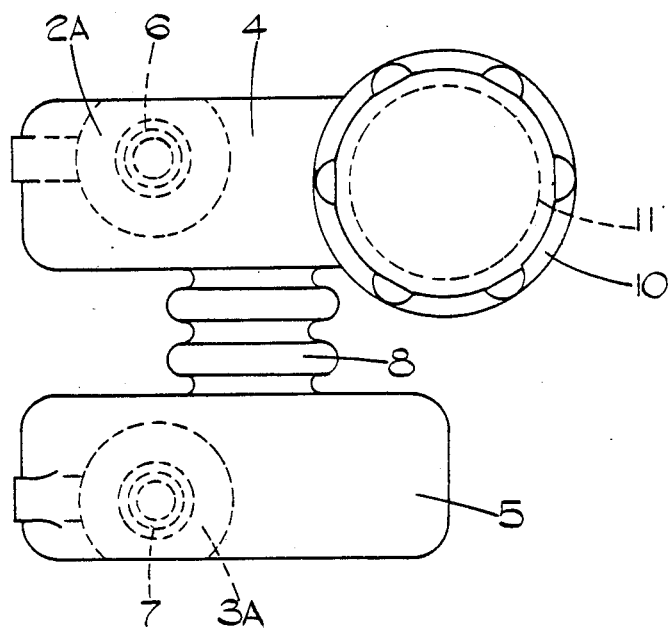
FIG. 5 is a top plan view of another alternative embodiment of the reservoir of the invention.

FIG. 5 shows an embodiment of the reservoir assembly suitable for use with a braking system having a self-contained fluid supply, as distinct from the continuous fluid flow type of system with which the previously described embodiments are adapted for use. In this embodiment, the flow connections 4A, 4B are dispensed with and one of the reservoir compartments, 4, 5, is provided with a fluid filler orifice (not shown) closed by a cap 10 threadedly engaged with a neck 11 surrounding the filler orifice. Fluid can pass freely between the compartments 4, 5, and through the connector means 8, as before, according to the fluid demands made by the cylinders, and any drop in fluid level in the compartments may be compensated for by addition of fluid through the filler orifice.

It will be seen that the reservoir of the invention is not only capable of being inexpensively manufactured from plastics material by a simple blow molding process, but it enables the various discrepancies referred to herein, arising from manufacturing tolerances, to be readily accommodated simply by flexure of the connector means 8.

We claim:

1. In a fluid reservoir for use with a master cylinder assembly of an hydraulic braking system utilizing a plurality of separate pressure cylinders, the improvement comprising:
   a plurality of separate fluid compartments, each compartment being adapted to be connected in sealed relationship to a respective one of said separate pressure cylinders for supplying fluid from said compartments to said respective pressure cylinders; and
   a flexible connector means interconnecting said compartments for permitting flow of fluid between said compartments and relative movement of said compartments with respect to each other so that the reservoir can be adjusted with respect to the pressure cylinders when making the sealed connections thereto without affecting the integrity of the reservoir and relative movement of said compartments is facilitated during use without affecting the integrity of the sealed connections.

2. The improvement as claimed in claim 1 wherein said compartments and flexible connector means comprise a single integrated element.

3. The improvement as claimed in claim 2 and further comprising a flanged rigid tubular connection component molded into the material of each compartment of the reservoir to form outlet members for connecting said reservoir to the separate pressure cylinders, said tubular connection component having a flanged portion having opposed flange surfaces closely surrounded by the reservoir material so that the flanged portion resists longitudinal withdrawal of said outlet members from the reservoir.

4. The improvement as claimed in claim 3 and further comprising serrations on said flanged portion for resisting rotation of each outlet member relative to the reservoir.

5. The improvement as claimed in claim 4 wherein said flanged portion comprises a separate component secured to said tubular connection component.

6. The improvement as claimed in claim 5 wherein said flanged portion is secured to said tubular connection component by crimping, said serrations being formed by said crimping.

7. The improvement as claimed in claim 1 wherein said connector means comprise a hollow convoluted tubular member.

8. The improvement as claimed in claim 7 wherein said connector means has a cross-sectional shape substantially the same as the peripheral outline shape of the sides of said compartments to which it is connected.

9. The improvement as claimed in claim 1 wherein said connector means has a cross-sectional shape substantially the same as the peripheral outline shape of the sides of said compartments to which it is connected.

10. The improvement as claimed in claim 9 wherein the cross-sectional area of said connector means is substantially co-extensive with said sides of said compartments.

11. The improvement as claimed in claim 10 and further comprising a flanged rigid tubular connection component molded into the material of each compartment of the reservoir to form outlet members for connecting said reservoir to the separate pressure cylinders, said tubular connection component having a flanged portion having opposed flange surfaces closely surrounded by the reservoir material so that the flanged portion resists longitudinal withdrawal of said outlet members from the reservoir.

12. The improvement as claimed in claim 1 wherein said connector means comprise a hollow tubular bellows member.

13. The improvement as claimed in claim 12 wherein said connector means has a cross-sectional shape substantially the same as the peripheral outline shape of the sides of said compartments to which it is connected.

* * * * *